US008694289B2

(12) United States Patent
Matsuoka (10) Patent No.: US 8,694,289 B2
(45) Date of Patent: Apr. 8, 2014

(54) BAYESIAN MODEL GENERATING COMPUTER PRODUCT, APPARATUS, AND METHOD

(75) Inventor: Hidetoshi Matsuoka, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 68 days.

(21) Appl. No.: 12/903,066

(22) Filed: Oct. 12, 2010

(65) Prior Publication Data

US 2011/0093245 A1   Apr. 21, 2011

(30) Foreign Application Priority Data

Oct. 16, 2009 (JP) .................. 2009-239749

(51) Int. Cl.
  G06F 17/11 (2006.01)
  G06F 17/12 (2006.01)
(52) U.S. Cl.
  CPC ............ G06F 17/11 (2013.01); G06F 17/12 (2013.01)
  USPC .............. 703/2; 703/6; 706/12; 706/16
(58) Field of Classification Search
  CPC .................................. G06F 17/11; G06F 17/12
  See application file for complete search history.

(56) References Cited

U.S. PATENT DOCUMENTS

| 7,454,326 | B2 | 11/2008 | Marcu et al. | |
| 7,899,771 | B2 | 3/2011 | Hu | |
| 2004/0111220 | A1* | 6/2004 | Ochs et al. | 702/19 |
| 2009/0288074 | A1* | 11/2009 | Carroll et al. | 717/158 |
| 2010/0235151 | A1 | 9/2010 | Yoneda et al. | |

FOREIGN PATENT DOCUMENTS

| JP | 6-195652 A | 7/1994 |
| JP | 2002-353440 A | 12/2002 |
| JP | 2003-216658 | 7/2003 |
| JP | 2003-330922 | 11/2003 |
| TW | 200608310 A | 3/2006 |
| WO | 2009-057778 | 5/2009 |

OTHER PUBLICATIONS

Sivia, D.S.; Skilling, John, Data Analysis: A Bayesian Tutorial, 8, 32, 55-56, 61-71, 184-187, 212-215 (2006).*
Schmidt, Mark "Least Squares Optimization with L1-Norm Regularization" 2 (Dec. 2005) <http://www.di.ens.fr/~mschmidt/Software/lasso.pdf>.*

(Continued)

Primary Examiner — Kamini S Shah
Assistant Examiner — Jay B Hann
(74) Attorney, Agent, or Firm — Fujitsu Patent Center (57) ABSTRACT

A non-transitory computer-readable recording medium stores therein a model generating program that causes a computer capable of accessing a memory device storing, among coefficients and input variables making up a model formula expressing an object to be modeled, statistical values associated with the coefficients to execute: inputting a data group as a combination of an input value and an output value with respect to the object; determining, based on a joint probability joining a first probability of occurrence of the model formula as defined by the statistical values and the coefficients and a second probability of occurrence of the model formula as defined by the input variables and output variables, values of the coefficients to maximize the joint probability by giving the data group to the input variables and the output variables of the joint probability; and outputting the values of the coefficients determined in relation to the model formula.

9 Claims, 8 Drawing Sheets

(56) References Cited

OTHER PUBLICATIONS

Farrow, Scott "Random Error and Simulation Models with an Unobserved Dependent Variable as Applied to the Benefits and Costs of the Clean Air Act" 6 (Jan. 26, 2008) <http://www.umbc.edu/economics/wpapers/wp_09_103_VarianceFarrow.pdf>.*

<Encyclopedia2.thefreedictionary.com> (searching for the phrase "simultaneous equations").*

Van der Merwe, Rudolph "Sigma-Point Kalman Filters for Probabilistic Inference in Dynamic State-Space Models" PhD Thesis, Oregon Health & Science University (2004) available at <http://www.cslu.ogi.edu/publications/ps/merwe04.pdf>.*

Taiwanese Office Action mailed Jul. 5, 2013 for corresponding Taiwanese Application No. 099131687, with Partial English-language Translation.

"'Japanese Office Action" mailed by JPO and corresponding to Japanese application No. 2009-239749 on Apr. 30, 2013, with English translation.

* cited by examiner

BAYESIAN MODEL GENERATING COMPUTER PRODUCT, APPARATUS, AND METHOD

CROSS REFERENCE TO RELATED APPLICATIONS

This application is based upon and claims the benefit of priority of the prior Japanese Patent Application No. 2009-239749, filed on Oct. 16, 2009, the entire contents of which are incorporated herein by reference.

FIELD

The embodiment discussed herein is related to model generation.

BACKGROUND

Conventionally, various engineering applications use a model (hereinafter, "model formula") expressing operation (output or next state) of an object to be modeled by a mathematical formula. The model formula includes input variables, state variables, physical constants, fitting parameters, etc.

The model formula is extracted by adjusting the fitting parameters (or physical constants) so that results of measurement and results of the model formula will match. Use of the model formula thus extracted makes it possible to easily predict the operation of the object to be modeled. It becomes possible, for example, to predict the operation at an input condition not yet measured from the model.

Conditions to be given to a simulation include preconditions and input conditions. A precondition refers to a condition that cannot be expressed without changing the fitting parameter when results of calculation are modeled by the model formula such as a condition not expressed by an input variable in a model formula. An input condition refers to a condition that can be expressed without changing the fitting parameter when the calculation results are modeled by the model formula, such as an input value and a value of the physical constant.

When conditions necessary for simulation are expressed, for example, by four variables of a, b, c, and d and when the model formula is expressed by a function of variables a and b, where a and b are input conditions and c and d are preconditions, if c or d changes, then a different model formula is necessary.

Since comprehensive simulation for various input conditions is very time-consuming, modeling is performed from the results of simulation in which some input conditions have been changed, making it possible to predict results of the input conditions not simulated (response surface methodology). One approach applies a polynomial model formula, etc., to calculation results or measurements of a part and predicting the whole by the least squares method (see, e.g., Japanese Laid-Open Patent Publication Nos. H6-195652 and 2002-353440).

With the conventional technologies described above, although partial calculation enables high-speed calculation, it can be extremely difficult to generate a model reflecting physical properties and therefore, it is a common practice to prepare the response surface by a model formula that does not have the physical properties such as a polynomial. Use of a model formula not having the physical properties causes various problems.

Figure 6:
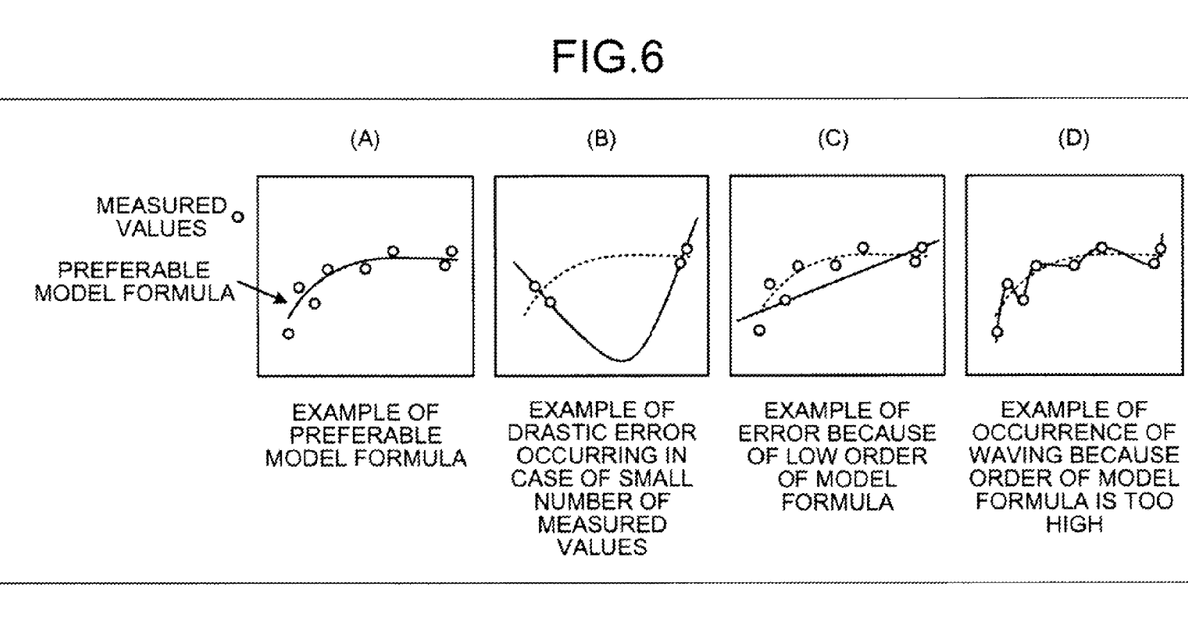
FIG. 6 is a diagram of examples of the model formula.

FIG. 6 is a diagram of examples of the model formula. (A) depicts a preferable model formula. (B) depicts a drastic error in the model formula when there are a small number of measured values. When the number of the measured values is small, a problem arises in that an impossible model formula is extracted or that the model formula is susceptible to measurement errors.

(C) depicts an error caused in the model formula by a low order of the model formula. When using a low-order polynomial, a problem arises in that the model formula is unable to adequately follow differences in operation, resulting in worsened accuracy.

(D) depicts an error caused in the model formula by a model formula of too high an order. In view of the low order in (C), when the order is raised to improve accuracy, a problem arises in that the model formula waves or in that measurement errors or calculation errors are introduced into the model formula. Thus, the generation of a model formula having physical properties is extremely difficult by the conventional technologies.

SUMMARY

According to an aspect of an embodiment, a non-transitory, computer-readable recording medium stores therein a model generating program that causes a computer capable of accessing a memory device storing, among coefficients and input variables making up a model formula expressing an object to be modeled, statistical values associated with the coefficients, to execute inputting a data group as a combination of an input value and an output value with respect to the object to be modeled; determining, based on a joint probability joining a first probability of occurrence of the model formula as defined by the statistical values and the coefficients and a second probability of occurrence of the model formula as defined by the input variables and output variables, values of the coefficients to maximize the joint probability by giving the data group input at the inputting to the input variables and the output variables of the joint probability; and outputting the values of the coefficients determined at the determining in relation to the model formula.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
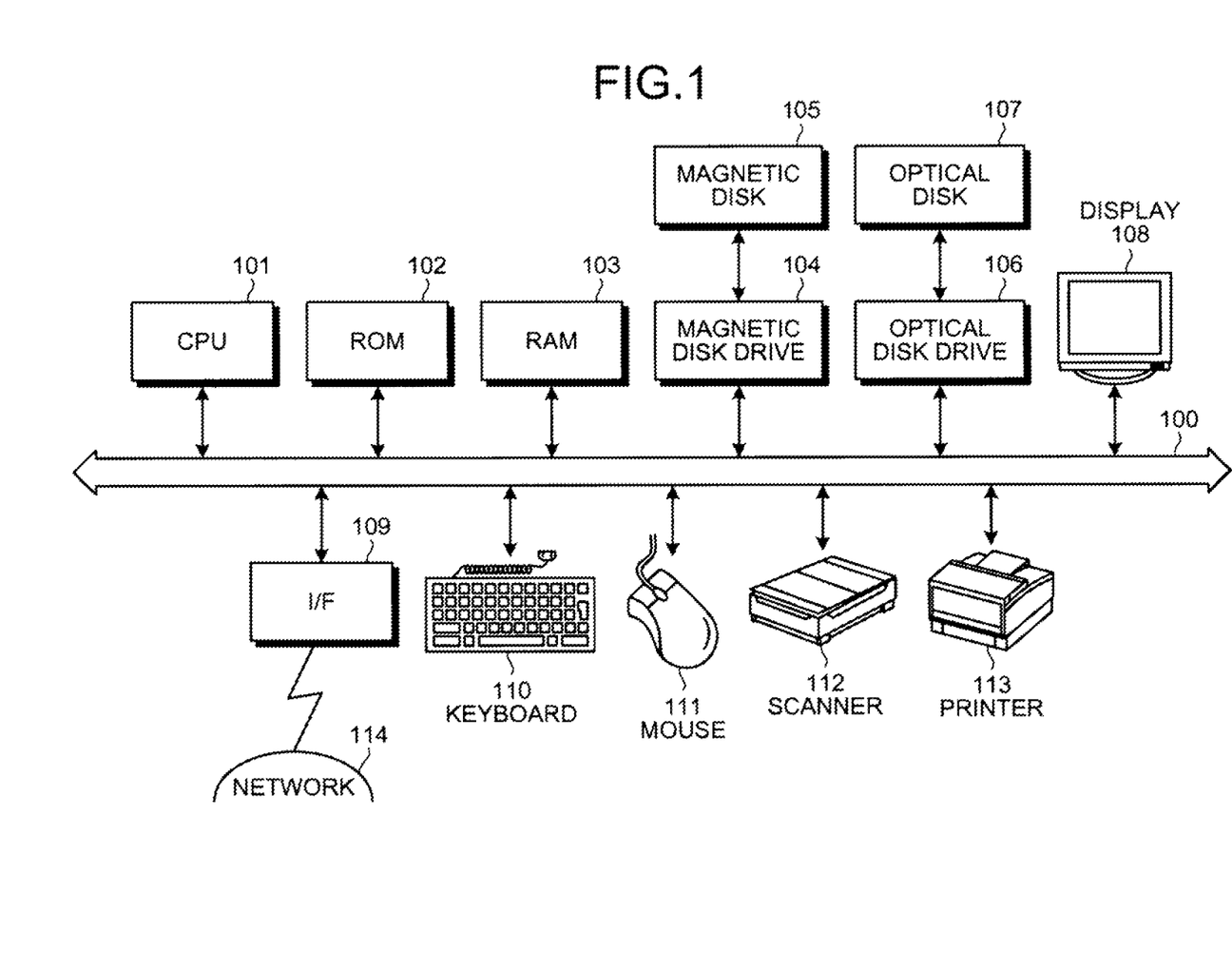
FIG. 1 is a block diagram of a hardware configuration of a model generating apparatus according to the embodiment.

FIG. 1 is a block diagram of a hardware configuration of a model generating apparatus according to the embodiment. As depicted in FIG. 1, the model generating apparatus includes a central processing unit (CPU) 101, a read-only memory (ROM) 102, a random access memory (RAM) 103, a magnetic disk drive 104, a magnetic disk 105, an optical disk drive 106, an optical disk 107, a display 108, an interface (I/F) 109, a keyboard 110, a mouse 111, a scanner 112, and a printer 113, respectively connected by a bus 100.

The CPU 101 governs overall control of the model generating apparatus. The ROM 102 stores therein programs such as a boot program. The RAM 103 is used as a work area of the CPU 101. The magnetic disk drive 104, under the control of the CPU 101, controls the reading and writing of data with respect to the magnetic disk 105. The magnetic disk 105 stores therein data written under control of the magnetic disk drive 104.

The optical disk drive 106, under the control of the CPU 101, controls the reading and writing of data with respect to the optical disk 107. The optical disk 107 stores therein data written under control of the optical disk drive 106, the data being read by a computer.

The display 108 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 108.

The I/F 109 is connected to a network 114 such as a local area network (LAN), a wide area network (WAN), and the Internet through a communication line and is connected to other apparatuses through the network 114. The I/F 109 administers an internal interface with the network 114 and controls the input/output of data from/to external apparatuses. For example, a modem or a LAN adaptor may be employed as the I/F 109.

The keyboard 110 includes, for example, keys for inputting letters, numerals, and various instructions and performs the input of data. Alternatively, a touch-panel-type input pad or numeric keypad, etc. may be adopted. The mouse 111 is used to move the cursor, select a region, or move and change the size of windows. A track ball or a joy stick may be adopted provided each respectively has a function similar to a pointing device.

The scanner 112 optically reads an image and takes in the image data into the model generating apparatus. The scanner 112 may have an optical character recognition (OCR) function as well. The printer 113 prints image data and text data. The printer 113 may be, for example, a laser printer or an ink jet printer.

Figure 2:
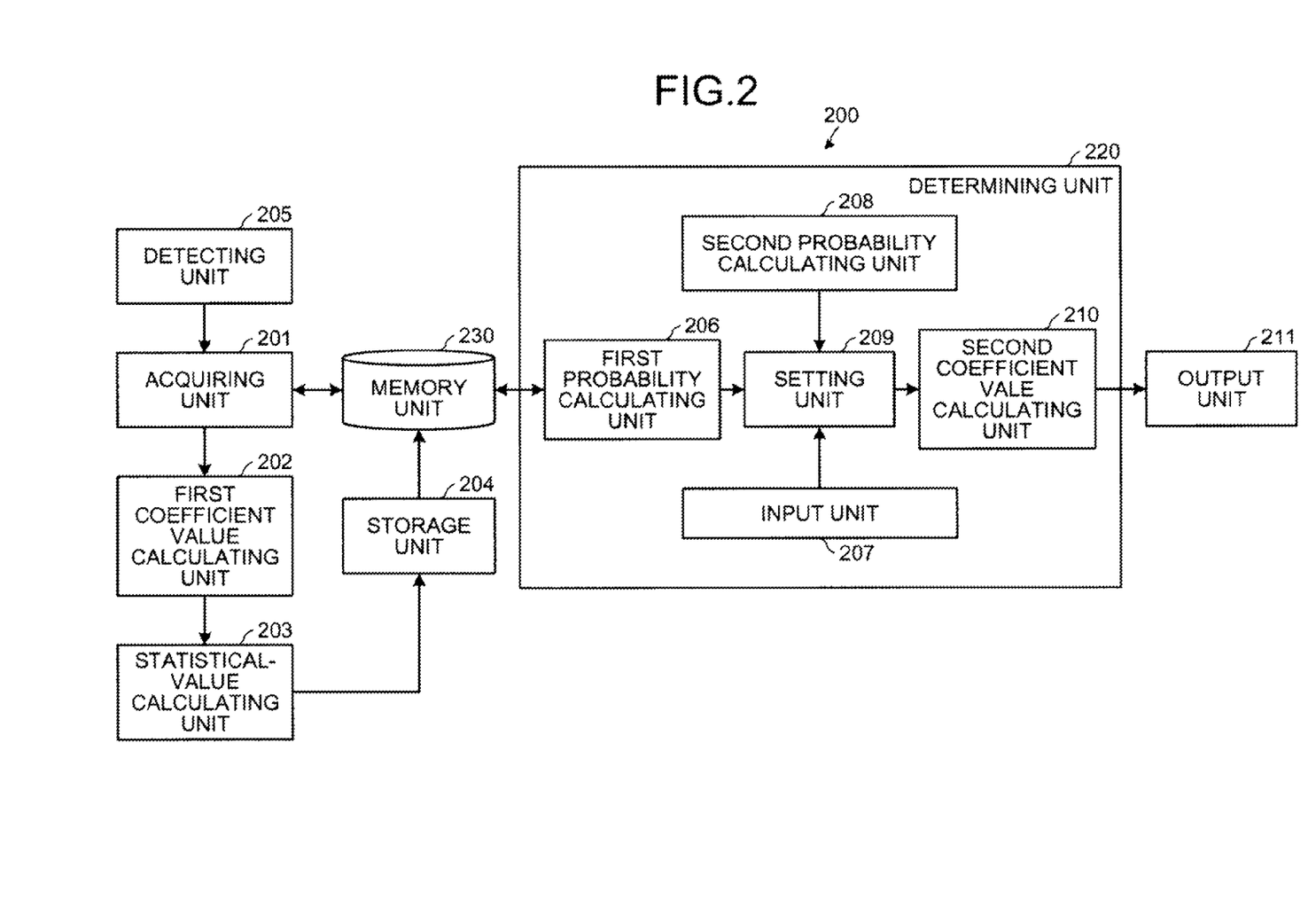
FIG. 2 is a block diagram of a functional configuration of a model generating apparatus 200.

FIG. 2 is a block diagram of a functional configuration of a model generating apparatus 200. The model generating apparatus 200 is configured to include a memory unit 230, an acquiring unit 201, a first coefficient value calculating unit 202, a statistical-value calculating unit 203, a storage unit 204, a detecting unit 205, a determining unit 220 (a first probability calculating unit 206, an input unit 207, a second probability calculating unit 208, a setting unit 209, and a second coefficient value calculating unit 210), and an output unit 211.

A function of the memory unit 230 is implemented, for example, by memory devices such as the ROM 102, the RAM 103, the magnetic disk 105, and the optical disk 107 depicted in FIG. 1. Functions of the acquiring unit 201 through the output unit 211 are implemented, for example, by causing the CPU 101 to execute programs stored, for example, in the memory devices such as the ROM 102, the RAM 103, the magnetic disk 105, and the optical disk 107 depicted in FIG. 1, or by the I/F 109.

The memory unit 230 stores therein values of the coefficients (hereinafter, "first coefficient values") making up the model formula expressing the object to be modeled. Here, the model formula is a model of the object to be modeled, expressed by a numerical expression. In general, the model formula is expressed by a polynomial.

Here, an example of a quadratic model formula f(x1, x2) consisting of two input variables (x1, x2) is described.

$$f(x) = ax_1^2 + bx_1x_2 + cx_2^2 + dx_1 + ex_2 + g \qquad (1)$$

In equation (1), a, b, c, d, e, and g are coefficients. Coefficients a, b, c, d, e, and g are variables, the values of which are to be obtained according to a technique to be described later. Although the order of equation (1) is two, the model formula may be of a higher order. The number of input variables may be one or may be three or more. Nonetheless, the model formula is appropriately set according to the object to be modeled or the behavior thereof. The model formula is not limited to a polynomial and may be a logarithmic function or an exponential function. Some terms of the polynomial may be a logarithmic function or an exponential function.

The memory unit 230 stores therein the statistical values related to the first coefficient values, in a first data group as a combination of input values and an output value of the object to be modeled. Here, an input value is input data given to the object to be modeled and an output value is output data of the object to be modeled when the input data is given thereto. The first data group may be sample data given as known data or may be a combination of input values and the resulting output when the input values are given to the simulator.

Statistical values are data statistically expressing the first coefficient values. Since the first data is plural, the statistical values are data that takes into account the dispersion of the first data. The statistical values are, for example, the mean $\mu$ and the standard deviation $\sigma$ (or may be variance or covariance) expressed for each of the coefficients a, b, c, d, e, and g. To remove correlation among the coefficients a, b, c, d, e, and g, the first coefficient values may be expressed for each principal component converted by the principal component analysis. For example, when the coefficient a undergoes the principal component analysis and is linearly converted to a=p1+p2+p3, statistical values are obtained for each of the coefficients p1 to p3 (mean $\mu p1$ to $\mu p3$, standard deviation $\sigma p1$ to $\sigma p3$).

Figure 3:
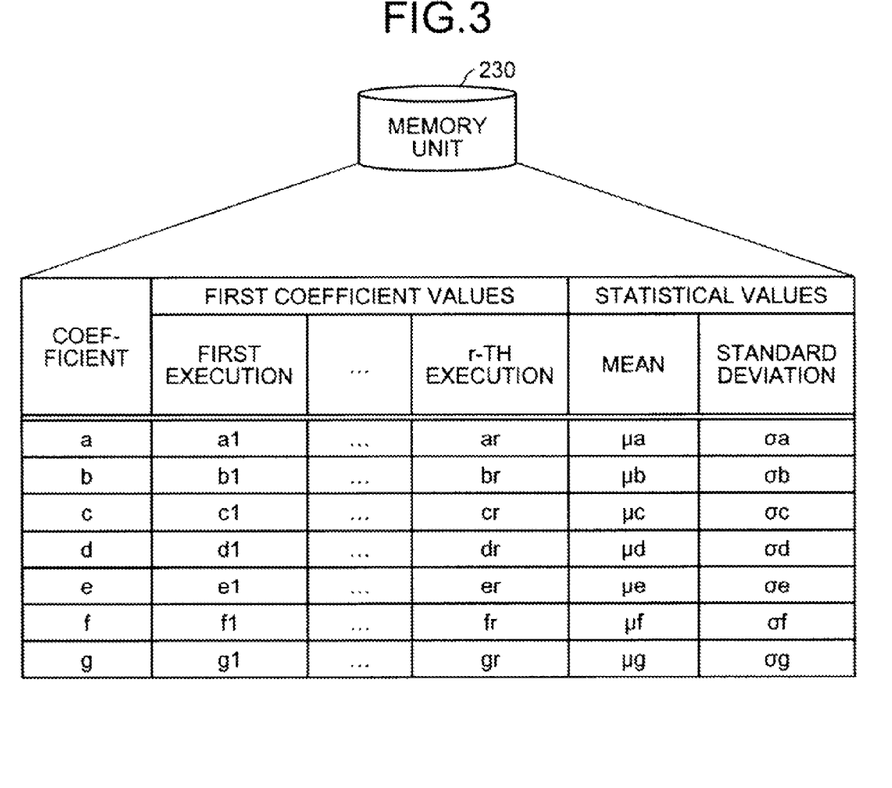
FIG. 3 is a diagram of one example of the contents of the memory unit 230.

FIG. 3 is a diagram of one example of the contents of the memory unit 230. In FIG. 3, plural first data groups are obtained. The statistical values may be given in advance, if known, or may be calculated using the first data group when the first data group is obtained. Here, while the first coefficient values are obtained for k times to calculate the statistical values, specific calculation of the statistical values will be described later. The memory unit 230 may be a memory device within the model generating apparatus 200 or a memory device external to the model generating apparatus 200. In the case of the memory device external to the model generating apparatus 200, the data is read out from or written to the memory unit 230 through communication by way of the network 114 shown in FIG. 1.

In FIG. 2, the acquiring unit 201 has a function of acquiring the first data group. The acquired first data group is stored in the memory unit 230.

The first coefficient value calculating unit 202 has a function of calculating the first coefficient values by giving the first data group acquired by the acquiring unit 201 to the model formula f. Specifically, for example, the first data are given to the model formula and the first coefficient values are obtained by the least squares method using equation (2), an error sum of squares S1 equation.

$$S1 = \sum_{i=1}^{N1}(f(X_i) - y_i)^2 \qquad (2)$$

In equation (2), N1 is the number of first data items. If the i-th first data item is given as $\{X_i, y_i\}$, the i-th input variable is $X_i$ and the output variable is $y_i$. When the number of input values is n (n=1, 2, ...), the input variable $X_i$ is given as $X_i = \{x1_i, x2_i, ..., xn_i\}$.

The first coefficient values can be obtained by solving simultaneous equations that are obtained by partially differentiating the error sum of squares S1 with respect to the coefficient. When the model formula f is a polynomial as shown by equation (1), the simultaneous equations become simultaneous linear equations and therefore, the coefficient values can be obtained at high speed by an inverse matrix calculation. In general, when the equation obtained by partially differentiating the model formula f with respect to the coefficient does not include any coefficient, the simultaneous equations become the simultaneous linear equations. The simultaneous equations are occasionally unsolvable depending on the form of the model formula f and in such a case, the coefficient values can be obtained by optimization as well.

The error sum of squares S1 of equation (2) is expanded to equation (3).

$$S1 = k_1 a^2 + k_2 b^2 + k_3 c^2 + k_4 d^2 + k_5 e^2 + k_6 g^2 + k_7 ab + k_8 ac + k_9 ad + k_{10} ae + k_{11} ag + k_{12} bc + k_{13} bd + k_{14} be + k_{15} bg + k_{16} cd + k_{17} ce + k_{18} cg + k_{19} de + k_{20} dg + k_{21} eg + k_{22} a + k_{23} b + k_{24} c + k_{25} d + k_{26} e + k_{27} g + k_{28} \qquad (3)$$

In equation (3), k1 to k21 are constants. For example, k7 can be expressed by equation (4).

$$k7 = 2 \sum_{j=1}^{N1} x_{1j} x_{2j}^3 \qquad (4)$$

It is assumed that the error sum of squares S1 is partially differentiated with respect to each of the coefficients a to e and g and that each result is equal to zero. For example, the equation that is equal to zero after partially differentiating the error sum of squares S1 with respect to the coefficient a is equation (5).

$$2k_1 a + k_7 b + k_8 c + k_9 d + k_{10} e + k_{11} g + k_{22} = 0 \qquad (5)$$

Using the equation that is equal to zero after partially differentiating with respect to each coefficient like equation (5), simultaneous linear equations with six unknowns can be obtained. The simultaneous linear equations with six unknowns are expressed by a matrix as equation (6).

$$T \begin{bmatrix} a \\ b \\ c \\ d \\ e \\ g \end{bmatrix} = K \qquad (6)$$

In equation (6), T is a 6×6 constant matrix and K is a constant vector. From equation (5), a first row of T becomes $\{2k_1, k_7, k_8, k_9, k_{10}, k_{11}\}$. Values of the coefficients a to e and g (first coefficient values) can be obtained by having both members of equation (6) multiplied, from the left, by the inverse matrix of T.

The statistical-value calculating unit 203 has a function of calculating the statistical values of the first coefficient values, based on results of the calculation by the first coefficient value calculating unit 202. Specifically, for example, in FIG. 3, the statistical-value calculating unit 203 calculates the mean μ and the standard deviation σ for each of the first coefficient values as shown. For example, with respect to the coefficient a, the statistical-value calculating unit 203 calculates the mean μ and the standard deviation σ of the first coefficient value a1 of the first execution through the first coefficient value ar of the r-th execution. In the case of performing, for example, the principal component analysis, the mean and the standard deviation are calculated for each principal component (e.g., p1 to p3 described above).

The storage unit 204 has a function of storing the first coefficient values and the statistical values of the first coefficient values to the memory device. Specifically, the storage unit 204 stores the first coefficient values and the statistical values of the first coefficient values as depicted, for example, in FIG. 3.

When the acquiring unit 201, after acquisition of the first data group for the r-th execution acquires the first data group for the r+1-th execution, the first coefficient value calculating unit 202 calculates the first coefficient values of the r+1-th execution. The statistical-value calculating unit 203 recalculates the statistical values (mean and standard deviation) of the first coefficient values based on the first coefficient values of the first execution through the r+1-th execution. The storage unit 204 prepares the item of the first coefficient values of the r+1-th execution for storing in the memory device and at the same time, updates the statistical values (mean and standard deviation) of the first coefficient values to the recalculated statistical values (mean and standard deviation) of the first coefficient values.

The detecting unit 205 has a function of detecting a model formula f generating request. Specifically, the detecting unit 205 judges a generating request has been made by user input and newly acquires the first data group during a period of time in which there is no generating request. For example, configuration may be such that a time slot will be set in which a generating request is not accepted and the first data group will be sequentially acquired during the time slot, thereby enabling effective use of idle time to accumulate the statistical values.

The determining unit 220 has a function of determining values of the coefficients of the model formula f. Specifically, the determining unit 220 obtains an arithmetic expression of a joint probability P joining a first probability Pp of occurrence of the model formula f defined by the statistical values (see FIG. 3) and the coefficients a, b, c, d, e, and g and a second probability Ps of occurrence of the model formula f defined by the input variable $X_i$ and the output variable $y_i$. Values of the coefficients are determined to maximize the arithmetic expression of the joint probability P. More specifically, the values of the coefficients of the model formula f are determined by the first probability calculating unit 206, the input unit 207, the second probability calculating unit 208, the setting unit 209, and the second coefficient value calculating unit 210.

The first probability calculating unit 206 has a function of calculating the first probability as an occurrence probability of the model formula f from the past statistical values (statistical values obtained from the first data group), based on the statistical values obtained from the first coefficient values stored in the memory unit 230. Specifically, the first probability Pp is calculated, for example, by equation (7).

$$Pp = \frac{1}{(2\pi)^{M/2} \prod_{j=1}^{M} \sigma_j} \exp\left(-\frac{1}{2}\sum_{j=1}^{M} \frac{(pj(f) - \mu_j)^2}{\sigma_j^2}\right) \quad (7)$$

In equation (7), M is the total number of the coefficients in the model formula f, pj(f) is the j-th coefficient in the model formula f, μj is the mean of the j-th coefficient pj(f) in the model formula f, and σj is the standard deviation of the j-th coefficient pj(f) in the model formula f. The first probability Pp expresses the probability of occurrence of the model formula f from past statistical values (statistical values obtained from the first data group) by a multi-dimensional normal distribution. A model with a large first probability means that in past statistical values, the model occurred frequently in the past statistical values and a model with a small first probability means that in past statistical values, the model rarely occurred.

In this embodiment, what is given to equation (7) is the statistical values alone and the j-th coefficient pj(f) of the model formula f in the first probability Pp remains as the variable. Therefore, the first probability calculating unit 206 obtains the arithmetic expression of the first probability Pp with the statistical values given thereto. The first probability Pp is not limited to equation (7) and may be another computation expression so long as it is an equation expressing the probability of occurrence of the model formula f from the past statistical values (statistical values obtained from the first data group).

For example, in the case of performing the principal component analysis, pj(f) becomes each principal component and M is occasionally smaller than the total number of the coefficients because of deletion of components of a small contribution, etc.

The first probability Pp will be specifically described. Here, to simplify description, description is made with the model formula f being f(x)=ax+1. It is assumed, for example, that the coefficient a can be approximated by the normal distribution with the mean of 2 and the standard deviation of 1. When the mean value μa=2 of the coefficient a is given to the coefficient a, the probability of the model formula f being f(x)=2x+1 is calculated as 0.398942 (probability of mean value of normal distribution) from a probability density function of the normal distribution. When the mean value μa=3 of the coefficient a is given to the coefficient a, the probability of the model formula f being f(x)=3x+1 is likewise calculated as 0.241971 (probability of location 1σ away from mean).

The input unit 207 has a function of inputting a second data group that is a combination of the input value and the output value with respect to the object to be modeled. Specifically, the second data group is the data group obtained after, for example, the first data group. The second data group is a set of combinations of N2 (ordinarily N2<<N1 but N2=N1 is acceptable) input values and output values. Like the first data group, the second data group may be sample data acquired as known data or may be a combination of a newly acquired input value and an resulting output when the input value is given to the simulator. The second data group may be a data group selected at random from the second data group.

The second probability calculating unit 208 has a function of calculating the second probability representing probability when the second data group is given to the model formula f. Specifically, the second probability Ps is calculated, for example, by equation (8).

$$Ps = \frac{1}{(2\pi)^{N2/2} \prod_{i=1}^{N2} \sigma y_i} \exp\left(-\frac{1}{2}\sum_{i=1}^{N2} \frac{\{f(X_i) - y_i\}^2}{\sigma y_i^2}\right) \quad (8)$$

In equation (8), N2 is the number of second data items (ordinarily N2<<N1 but N2=N1 is acceptable). $X_i$ is an input variable to which the input value of the i-th second data item is given. $Y_i$ is an output variable to which the measured value of the i-th second data item is given. $\sigma y_i$ is a standard error (weight) of the measured value $y_i$ of the i-th second data item. $\sigma y_i$ may be a fixed value (e.g., $\sigma y_i=1$) common to all measured values or may be a fixed value different for each measured value $\sigma y_i$.

The number of the input variables $X_i$ is equal to that of the input variables of the model formula f. For example, when equation (1) is used as the model formula f, the i-th item of the second data becomes $\{x1_i, x2_i, y_i\}$ and the value of the input variable $X_i$ becomes $X_i=\{x1_i, x2_i\}$.

The second probability Ps will be specifically described. Here, to simplify description, description is made with the model formula f being f(x)=2x+1. When it is assumed that a certain item of the second data (x, y) has an error (measurement error or calculation error of simulation) of a standard deviation of 1 in normal distribution, a point at (x, y)=(0, 0) may actually be the point (0, 1), which has become the point (0, 0) due to the error. The probability of the original point being (0, 1) is 0.241971, the probability of location 1σ away from the mean of the normal distribution.

Since the model formula f passes through the point (0, 1), the probability in this case is Ps=0.241971. If the model formula f is f(x)=2x, the model formula f passes through the point (0, 0) and therefore, the probability becomes 0.398942, the probability of the mean of the normal distribution. Since there are plural items of the second data (x, y), the probabilities when each item of the second data is given to a certain model formula f are multiplied together to become the second probability Ps.

In this embodiment, the second data group is given after preparation of the simultaneous equations to be described later. Therefore, the second probability calculating unit 208 obtains an arithmetic expression of the second probability Ps by giving a preset $\sigma y_i$ to equation (8).

The setting unit 209 has a function of setting the simultaneous equations to obtain the second coefficients to be given to the coefficients of the model formula f. Specifically, the setting unit 209 sets the arithmetic expression of the joint probability P by joining (multiplying) the arithmetic expression of the first probability Pp and the arithmetic expression of the second probability Ps.

The first probability Pp represents the probability of occurrence of the model formula f from the past statistical values (statistical values obtained from the first data group) and the second probability Ps represents the likelihood of the model formula f from this time's sample (second data group). Maximizing the joint probability P of the first probability Pp and the second probability Ps means obtaining the most likely model formula.

In this example, while the joint probability P is expressed by a complicated expression, what is required is to maximize the joint probability P and when a part not inclusive of the coefficients is replaced by a constant K, the joint probability P can be transformed into equation (9).

$$P = K \times \exp(-1/(S1+S2)) \quad (9)$$

Here, S2 is the error sum of squares expressed by equation (10) (where, for simplification, $\sigma y_i = 1$ is assumed), i.e., from the arithmetic expression of the joint probability P, the error sum of squares S2 that determines the model formula f maximizing the joint probability P is extracted.

$$S2 = \sum_{i=1}^{N2} (f(X_i) - y_i)^2 + \sum_{j=1}^{M} \left( \frac{pj(f) - \mu_j}{\sigma_j} \right)^2 \quad (10)$$

The model formula f(x) is determined so as to maximize the joint probability P of the first probability Pp and the second probability Ps. Specifically, since the joint probability P assumes a maximum value when the error sum of squares S2 is minimal, it comes down to a problem of minimizing the error sum of squares S2. Since the error sum of squares S2 takes a convex function, it comes down to a calculation to solve a most common, simple optimization problem called a convex optimization. Therefore, automatic optimization can easily be performed. Alternatively, this may be solved by a method to be described later.

A second term of a right-hand member of equation (10) corresponds to the first probability Pp and a first term of the right-hand member corresponds to the second probability Ps. That is to say, equation (10) is formed to have the first term of the right-hand member reflecting the physical property added to the error sum of squares S1. Therefore, even if the number of items of the second data group is small, the first term of the right-hand member works effectively and therefore, the second coefficient values can be obtained with high accuracy.

Thereafter, the setting unit 209 partially differentiates the error sum of squares S2 to prepare simultaneous equations, by the same techniques indicated by the equations (3) to (6).

The second coefficient value calculating unit 210 has a function of calculating the second coefficient values by solving the simultaneous equations set by the setting unit 209. Specifically, the second coefficient value calculating unit 210 calculates the second coefficient value to be given to each of the coefficients a to e, and g by giving the second data group to the input variables $X_i$ and the output variables $y_i$ defined within the simultaneous equations prepared by the setting unit 209.

If the model formula f is a polynomial, the simultaneous equations become the simultaneous linear equations and the coefficient values can be obtained at high speed by the inverse matrix calculation as indicated in connection with equation (6). In general, when the equation obtained by partially differentiating the model formula f with respect to the coefficient does not include any coefficient, the simultaneous equations become the simultaneous linear equations. The simultaneous equations are occasionally unsolvable depending on the form of the model formula f, in which case, the coefficient values can be obtained by the optimization as well.

The output unit 211 has a function of outputting the second coefficient values calculated by the second coefficient value calculating unit 210 in relation to the model formula f. Specifically, the output unit 211 substitutes, for example, the second coefficient values for the corresponding coefficients of the model formula f and outputs the model formula f after the substitution. Forms of output include, for example, display on the display 108, print output to the printer 113, and transmission to external devices by the I/F 109. The output may be stored to a memory area of the RAM 103, the magnetic disk 105, the optical disk 107, etc. The output unit 211 may prepare and output a response curve of the model f using the second coefficient values substituted.

Figure 4A:
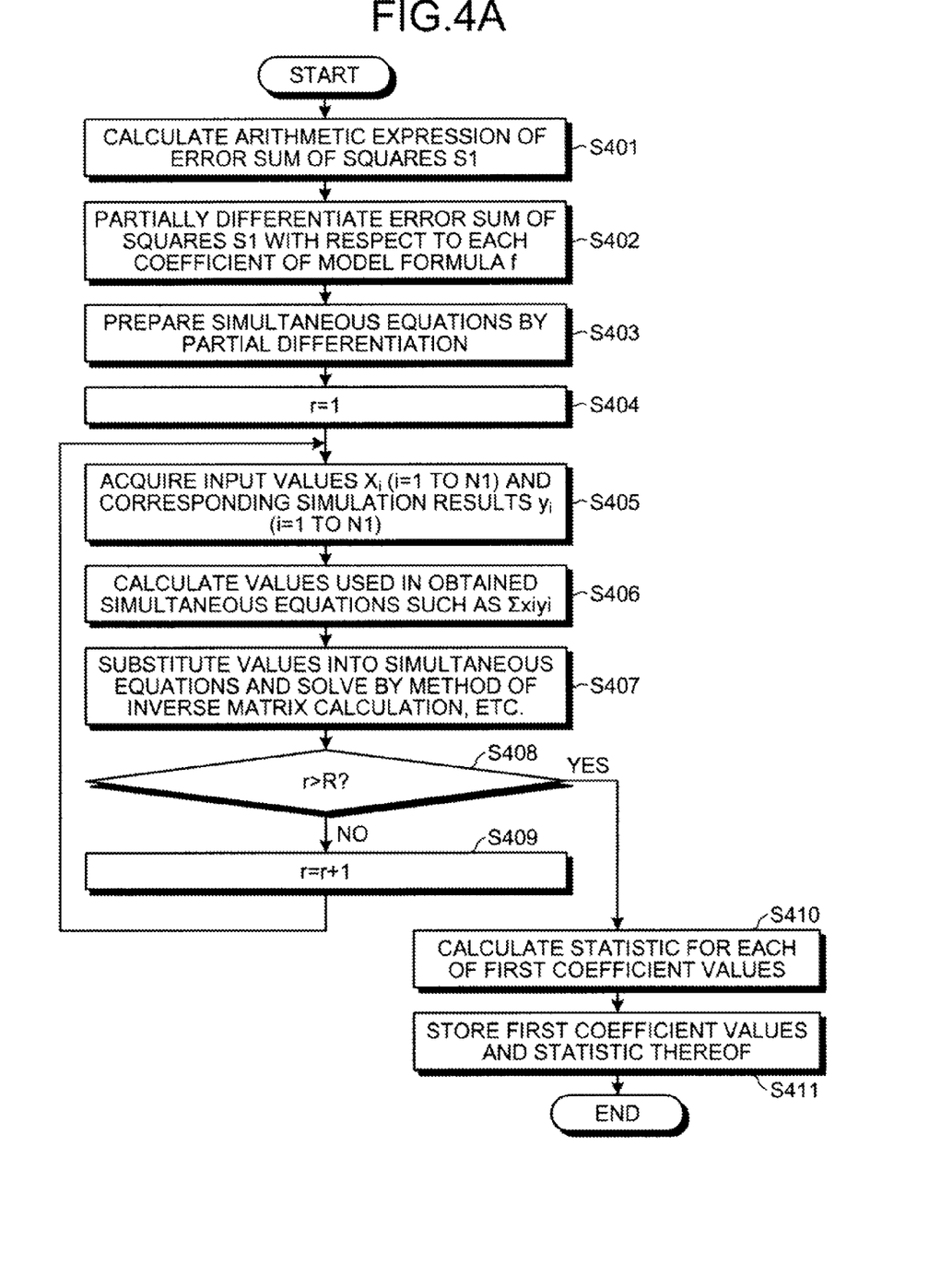
FIG. 4A is a flowchart of a statistical values extraction procedure by the model generating apparatus 200.

FIG. 4A is a flowchart of a statistical values extraction procedure by the model generating apparatus 200. FIG. 4A depicts a procedure for solving by the simultaneous equations. Firstly, the first coefficient value calculating unit 202 calculates the arithmetic expression of the error sum of squares S1 (step S401) and partially differentiates the error sum of squares S1 with respect to each coefficient of the model formula f (step S402). By this partial differentiation, the simultaneous equations are prepared (step S403).

Then, the number of execution times r is set to r=1 (step S404) and the input values $X_i$ and the corresponding simulation results $y_i$ are acquired (step S405). Then, values k are calculated that are associated with the coefficients a to e and g in the simultaneous equations prepared at step S403 (step S406). For example, in equation (5), $k_1$, $k_7$ to $k_{11}$, and $k_{22}$ are calculated.

Then, the values k calculated at step S406 are substituted into the simultaneous equations prepared at step S403 and the first coefficient values of the coefficients a to e and g in the r-th execution are obtained by the inverse matrix calculation (step S407). Then, judgment is made of whether r>R is true (step S408). R is the number of obtainable measured values or simulation results under different preconditions. R is a threshold of R>1.

If r>R is not true (step S408: NO), then r is incremented (step S409) and the flow returns to step S405. In this case, the acquiring unit 201 newly acquires the input values $X_i$ and the corresponding simulation results $y_i$.

On the other hand, if r>R is true (step S408: YES), then the statistical-value calculating unit 203 calculates the statistical values for each of the first coefficient values (step S410). Then, the storage unit 204 stores the first coefficient values and the statistical values thereof (step S411), ending a sequence of statistical values extraction processing.

Figure 4B:
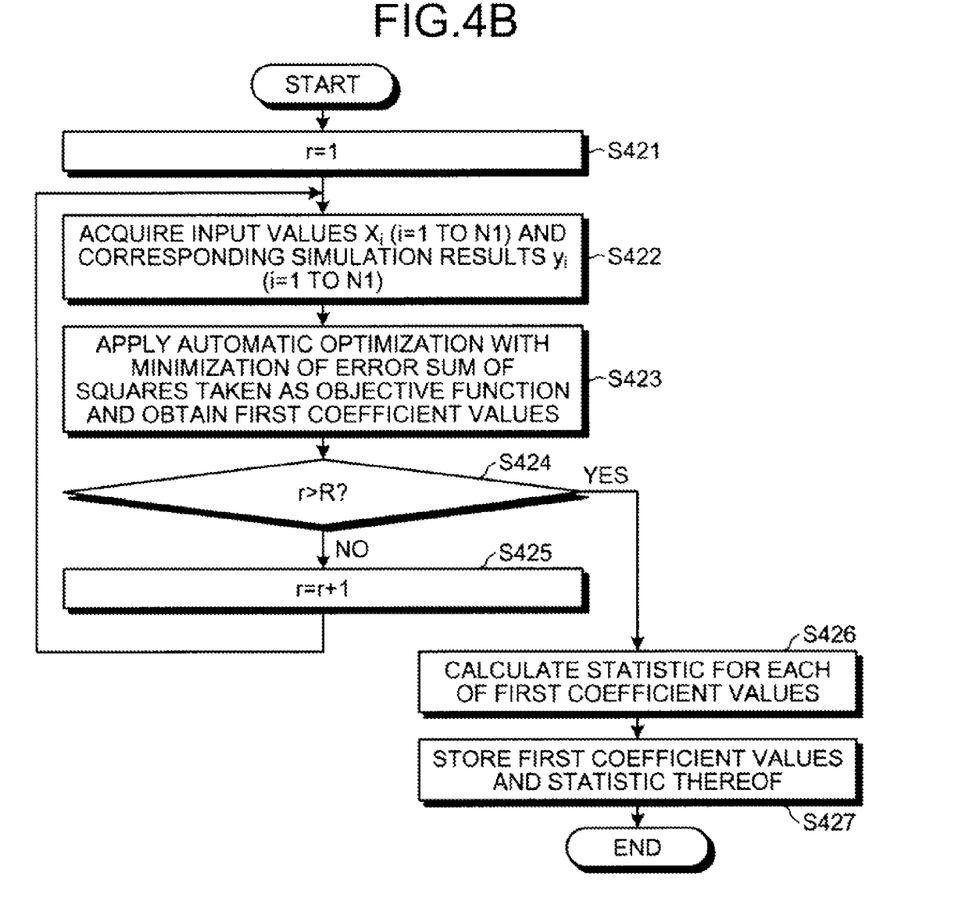
FIG. 4B is another flowchart of the statistical values extraction procedure by the model generating apparatus 200.

FIG. 4B is another flowchart of the statistical values extraction procedure by the model generating apparatus 200. FIG. 4B depicts a procedure for solution by the optimization. Firstly, the number of execution times r is set to r=1 (step S421) and the input values $X_i$ and the corresponding simulation results $y_i$ are acquired (step S422).

Then, the first coefficient values are obtained by applying the automatic optimization with the minimization of the error sum of squares S2 taken as an objective function (step S423). The function f(x) as the model is determined so as to maximize the joint probability P of the first probability Pp and the second probability Ps. Specifically, since the joint probability P assumes the maximum value when the error sum of squares S2 of equation (10) is minimal, it comes down to the problem of minimizing the error sum of squares S2. Since the error sum of squares S2 takes the convex function, it comes down to a calculation to solve the most common, simple optimization problem called the convex optimization. Like this, the first coefficient values are obtained.

Thereafter, judgment is made of whether r>R is true (step S424). R is a threshold of R>1. If r>R is not true (step S424: NO), then r is incremented (step S425) and the flow returns to step S422, in which case, the acquiring unit 201 newly acquires the input values $X_i$ and the corresponding simulation results $y_i$ (step S422).

On the other hand, if r>R is applicable (step S424: YES), then the statistical-value calculating unit 203 calculates the statistical values for each of the first coefficient values (step S426). Then, the storage unit 204 stores the first coefficient values and the statistical values thereof (step S427), ending a sequence of statistical values extraction processing.

Figure 5A:
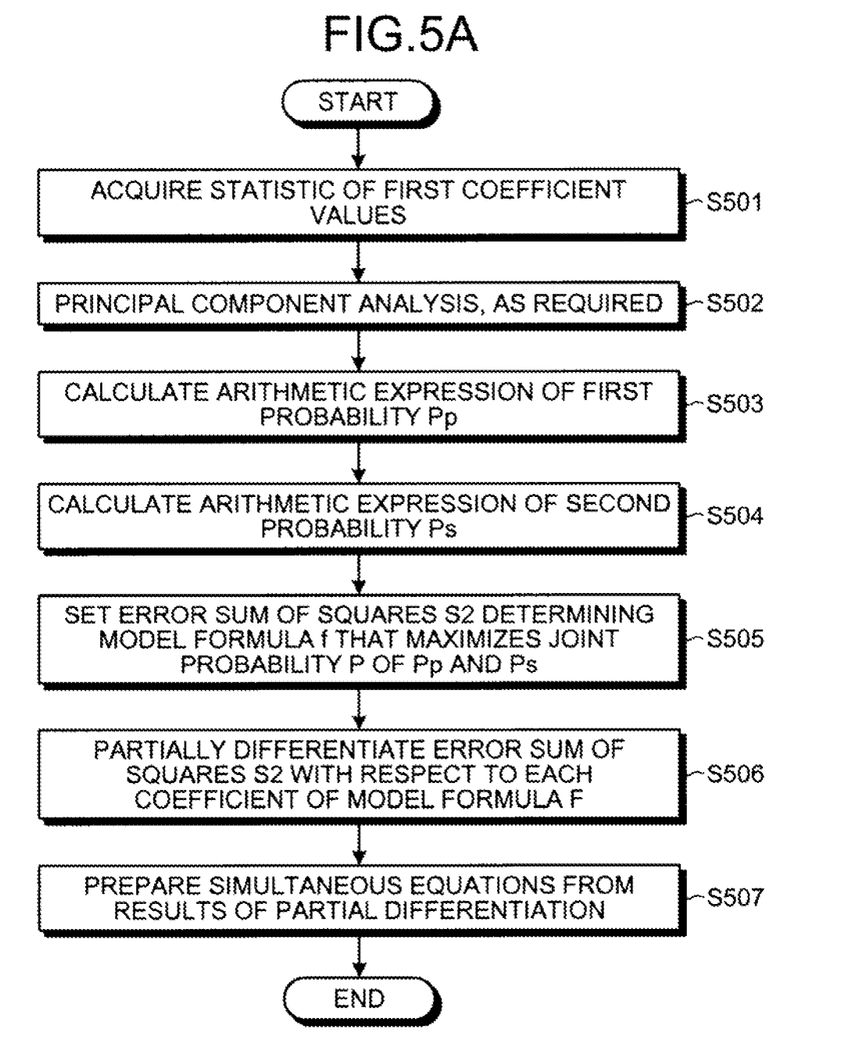
FIG. 5A is a flowchart of a model generating procedure by the model generating apparatus 200.

FIG. 5A is a flowchart of a model generating procedure by the model generating apparatus 200.

Firstly, the statistical values to be given to M coefficients is acquired from the memory unit 230 (step S501) and the principal component analysis is executed, as required (step S502). The principal component analysis, which orthogonalizes the first coefficient values, enables correlated components to be removed.

Then, the first probability calculating unit 206 substitutes the statistical values into equation (7), thereby calculating the arithmetic expression of the first probability Pp as the probability of occurrence of the model formula f for given the statistical values (step S503).

Then, the second probability calculating unit 208 calculates the arithmetic expression of the second probability Ps expressing the likelihood of the model formula f when given N2 items of second data group (step S504). Specifically, the arithmetic expression of the second probability Ps is calculated by substituting $\sigma y_i$ into equation (8).

Then, the setting unit 209 executes steps S505 to S507. Specifically, the setting unit 209 sets the error sum of squares S2 determining the model formula f that maximizes the joint probability P of the first probability Pp and the second probability Ps (step S505). Specifically, the setting unit 209 calculates the arithmetic expression of the joint probability P by joining (multiplying) the arithmetic expression of the first probability Pp and the arithmetic expression of the second probability Ps. Then, from the arithmetic expression of the joint probability P, the error sum of squares S2 is extracted that determines the model formula f maximizing the joint probability P.

Then, the error sum of squares S2 is partially differentiated with respect to each coefficient (step S506) and the simultaneous equations are prepared from the results of the differentiation (step S507). Re-execution of the processing at steps S501 to S507 may be omitted unless the statistical values have changed. Even if the statistical values have been updated, when as much computation as possible has been performed in the literal expression, re-execution is unnecessary or re-execution of only a limited part is necessary. When the model formula is changed, however, the re-execution is necessary.

Figure 5B:
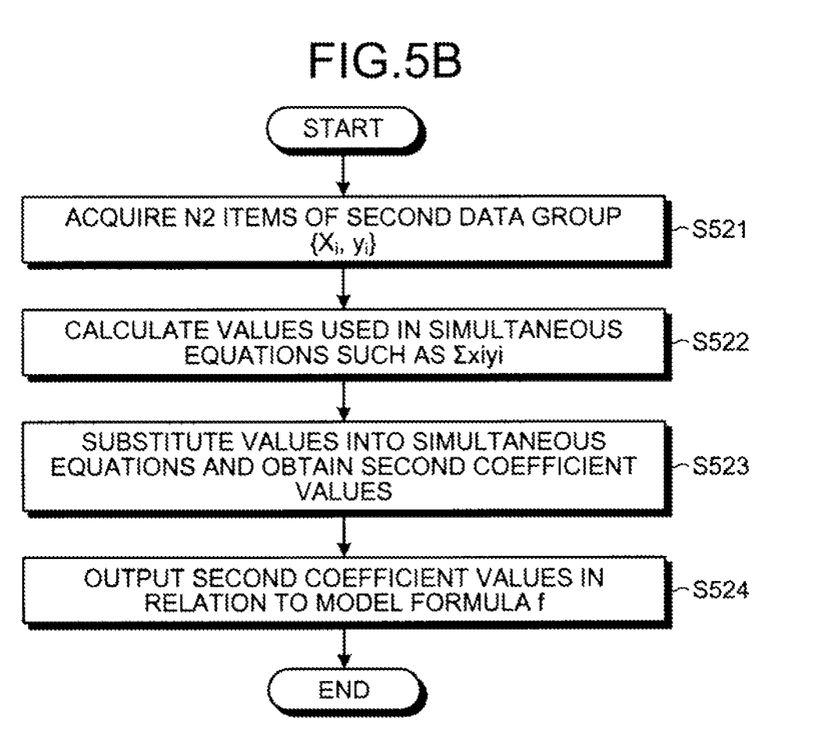
FIG. 5B is another flowchart of the model generating procedure by the model generating apparatus 200.

FIG. 5B is another flowchart of the model generating procedure by the model generating apparatus 200. The flowchart of FIG. 5B depicts a procedure of obtaining the second coefficient values, using the simultaneous equations obtained in FIG. 5A.

Firstly, the input unit 507 inputs N2 items of second data group (step S521). Then, the second coefficient value calculating unit 210 calculates values k associated with the coefficients a to e and g in the simultaneous equations prepared at step S507 (step 522). For example, when the simultaneous equations include an equation such as equation (5), $k_1$, $k_7$ to $k_{11}$, and $k_{22}$ are calculated by substituting N2 items of second data group.

Then, the values k calculated at step S522 are substituted into the simultaneous equations prepared at step S507 and the second coefficient values of the coefficients a to e and g are obtained by the inverse matrix calculation (step S523). Thereafter, the output unit 211 outputs the second coefficient values thus calculated in relation to corresponding coefficients of the model formula f (step S524), ending a sequence of model generating processing.

Configuration may be such that the second data group obtained at step S503 is acquired as the first data group at step S401 of FIG. 4A. That is to say, to acquire the second data group next time, the second data group acquired this time will be treated as the first data group. Since ordinarily N2<<N1 is applicable, however, additional samples must be acquired so that the number of samples will reach N1 or come close to N1, whereby the first coefficient values are obtained with respect to this time's second data group and the statistical values are updated to the latest state.

Thus, according to this embodiment, which is capable of supplementing the statistical values even when the number of items of the second data group is small, there is no occurrence of a drastic error and prediction can be made with high accuracy. Since the first data group as past data can be handled as statistical values, easier implementation and easier incorporation into existing devices can be achieved. Discarding the first data group and storing only the statistical values enable memory saving to be achieved. The statistical values are not necessarily required to be prepared from actual data and may be prepared from predicted model geometry if the model geometry is predictable.

Calculation of the statistical values is executed during idle time so that a non-busy time, for example, nighttime, etc., may be utilized to achieve reduced calculation cost. By contrast, when the second coefficient values are sought, the model generation can be performed in a short time simply by giving the second data group.

Idle time may be utilized to acquire the first data group under the calculation condition under which calculation has not yet been made and extract the statistical values thereof. For example, when the calculation conditions of 10° C., 15° C., and 100° C. temperatures are accumulated in the memory device, a combination of all or a part of the input values not yet calculated under these temperatures is acquired as the first data group. This enables the statistical values to be covered under any calculating condition.

To enhance the accuracy of the model generation, it is preferable that the statistical values under various conditions be prepared. For example, when the calculation conditions of 10° C., 15° C., and 100° C. temperatures are accumulated in the memory device, configuration may be such that the calculation condition of 12.5° C. is generated by the interpolation (interpolation between 10° C. and 15° C.), the calculation condition of 5° C. is generated by the extrapolation (extrapolation between 10° C. and 15° C.), and the calculation conditions, at intervals of 20° C., from 10° C. to 100° C. are automatically generated by the experimental design method. Further, configuration may be such that the calculation conditions causing the values to abruptly change, the calculation conditions having no similar conditions in the past, and the calculation conditions of high importance will be automatically generated. Thus, the automatic generation of the calculation conditions enables the statistical values for enhanced accuracy to be prepared.

Obtaining the second coefficient values so as to maximize the joint probability makes it possible to realize a high-accuracy calculation procedure from a small number of results in a short period of time, using existing convex optimization technology.

The expression of the model formula f by a polynomial makes it possible to use the inverse matrix solver as a widely-applicable, ultra-high-speed calculation technique, resulting in realization of the high-speed processing and the high-accuracy model generation.

Examples of the embodiment are described.

A first example is a calculation example of the yield of variations among Static Random Access Memory (SRAM) chips when the object to be modeled is the SRAM. This is used for predicting results of overall inter-chip variations from a small number of samples of the inter-chip variations and enables overall prediction to be realized from a small number of samples, at high speed.

In the extraction of the statistical values in the first example, the first data group $\{X_i, y_i\}$ is a large number of samples of past inter-chip variations (the input value $X_i$ being an inter-chip variations variable, the measured value $y_i$ being the yield). There are N1 samples for r preconditions that are different. The model formula f is a function of the inter-chip variations variable and can be expressed by a polynomial. The output value of the model formula f when given the input value $X_i$ becomes the yield $f(X_i)$. The statistical values are extracted from the first data group and when a small number of second samples are given, the second coefficient values are obtained that are to be given to the coefficients of the model formula f, the function of the inter-chip variations variable.

A second example is an example of preparation of variation (table of load and slew) for condition calculation of a cell library when the object to be modeled is the cell library. This achieves a reduced number of simulations and realizes a higher speed.

In the extraction of the statistical values in the second example, the first data group $\{X_i, y_i\}$ is a large number of past simulations ($X_i$ being load and slew, $y_i$ being the value of the cell of a delay, etc.) and N1 is the number of kinds of $X_i$. The model formula f is a function expressing a load-slew relation and can be expressed by a polynomial. The statistical values is extracted from the first data group and when a small number of second samples are given, the second coefficient values are obtained that are to be given to the coefficients of the model formula f as a function expressing the load-slew relation.

A third example is an example of extracting the statistical values from results of a slow-speed detailed calculation and combining the statistical values with results of high-speed general calculation to perform a high-speed and high-accuracy calculation. This makes it possible to extract the statistical values from a large volume of past results of the slow-speed detailed calculation. In the extraction of the statistical values in the third example, the first data group $\{X_i, y_i\}$ is the results of the slow-speed detailed calculation ($X_i$ being the input value, $y_i$ being the output value) and N1 is the number of the calculations. The statistical values are extracted from the first data group and when the second sample is given, the second coefficient values are obtained that are to be given to the coefficients of the model formula f.

A fourth example is an example of extracting the statistical values from a large volume of results of a combination of wide-range input conditions of the high-speed general calculation and combining the statistical values with the results of the slow-speed detailed calculation to obtain wide-range results at high speed. This makes it possible to extract the statistical values from a large volume of past results of the high-speed general calculation. In the extraction of the statistical values in the fourth example, the first data group $\{X_i, y_i\}$ is the results of the high-speed general calculation ($X_i$ being the input value, $y_i$ being the output value) and N1 is the number of the calculations.

A fifth example is an example of preparing the statistical values of fitting parameters of little physical significance at the time of extracting SPICE parameters. This makes it possible to extract parameters accurately, even from a small number of measured samples (first data group).

In the extraction of the statistical values in the fifth example, the first data group $\{X_i, y_i\}$ is a large volume of past SPICE simulation results and measured samples ($X_i$ being the condition value, $y_i$ being the measured value) and N1 is the number of the measured samples.

As described above, the embodiment has the effect of controlling a conventional problem of instability, namely, occurrence of the impossible model formula f. Since this instability occurs significantly especially when a high-order model formula f is used, use of the high-order model formula f has conventionally been difficult unless an enormous number of samples are available.

In the embodiment, since the coefficient of the impossible model formula f is calculated to be of a very low probability by the use of past statistical values, the generation of the impossible model formula f can be controlled. On the other hand, only a possible model formula f, even if of a high order, can be generated. This makes it possible to generate a high-accuracy model even if the object to be modeled cannot be expressed by other than the high-order model formula f.

Conventionally, when using the model formula f, for example, of a linear equation of one unknown ($f(x)=ax+b$), at least two samples were required to determine the model formula. Likewise, the model formula, for example, of a cubic equation of six unknowns required at least 84 samples. In fact, unless such samples are ideally distributed, it was possible that the inverse matrix was not solved (became a singular matrix) without much more samples.

Even if the inverse matrix could be solved at last, there was the problem of instability (generation of the impossible model formula f) and to avoid such a problem, much more samples were required. The embodiment makes it possible to generate even a high-dimensional, high-order model without any difficulty from one sample.

As described, the embodiment has the effect of being capable of reflecting a physical property of the object to be modeled with high accuracy. Even if the order is high, modeling can be made with accuracy. Since a small number of items of the second data group are supplemented with the past statistical values, modeling can be made with accuracy.

The model generating method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, is read out from the recording medium and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
a memory device storing, among M coefficients and input variables making up a model formula expressing an object to be modeled, statistical values associated with the coefficients and obtained from a first data group;
an input unit that inputs a second data group as a combination of an input value and an output value with respect to the object to be modeled, wherein the second data group includes N data and N is smaller than M;

a first obtaining unit that obtains an arithmetic expression expressing a first probability that expresses a probability of occurrence of the model formula from the statistical values obtained from the first data group and is defined by the statistical values and the coefficients;

a second obtaining unit that obtains an arithmetic expression expressing a second probability that represents a likelihood of the model formula from the second data group and is defined by the input variables and output variables;

a setting unit that sets an arithmetic expression expressing a joint probability by joining the arithmetic expression expressing the first probability and the arithmetic expression expressing the second probability;

a determining unit that, based on the arithmetic expression expressing the joint probability, determines values of the coefficients to maximize the joint probability by giving the second data group input by the input unit to the input variables and the output variables of the joint probability; and an output unit that outputs the values of the coefficients determined by the determining unit in relation to the model formula;

wherein each of the M coefficients is obtained by a partial differentiation with respect to the each coefficient.

2. The model generating apparatus according to claim 1, further comprising:

a calculating unit that calculates, by giving the statistical values read out from the memory device to statistical value related variables defined by the arithmetic expression expressing the first probability, an arithmetic expression expressing the first probability with the coefficients taken as variables, wherein the setting unit sets the arithmetic expression expressing the joint probability by joining the calculated arithmetic expression expressing the first probability and the arithmetic expression expressing the second probability.

3. The model generating apparatus according to claim 1, further comprising:

a setting unit that sets an error sum of squares composed of a first error sum of squares based on output results when the input values are given to the model formula and the output values and a second error sum of squares based on the coefficients and the statistical values, wherein the determining unit determines, by giving the second data group to the error sum of squares set at the setting so that the error sum of squares will be minimized.

4. The model generating apparatus according to claim 3, wherein the determining unit calculates the values of the coefficients by expanding the error sum of squares into simultaneous equations and executing inverse matrix calculation processing when the model formula is expressed by a polynomial.

5. The model generating apparatus according to claim 1, further comprising:

an acquiring unit that acquires a past data group from the second data group;

a first calculating unit that calculates coefficient values associated with the past data group, by giving the acquired past data group to the model formula;

a second calculating unit that calculates the statistical values based on calculation results obtained by the first calculating unit; and a storing unit that stores the calculated statistical values to the memory device.

6. The model generating apparatus according to claim 5, wherein the first calculating unit calculates the coefficient values associated with the past data group each time the past data group is acquired, the second calculating unit calculates the statistical values each time the coefficient values associated with the past data group are calculated, and the storing unit updates the statistical values when the statistical values are newly calculated.

7. The model generating apparatus according to claim 5, wherein the acquiring unit newly acquires the past data group when a model formula generating request is not detected.

8. A model generating method comprising:

storing into a memory device by a computer, values of coefficients and statistical values of the coefficients, wherein the coefficients are included in a model formula expressing a relationship between first input values input into an object to be modeled and first output values output from the object to be modeled according to the first input values, and the statistical values are based on the values of the coefficients;

calculating, by the computer and using a first arithmetic expression, a first probability of occurrence of the model formula based on the statistical values and the values of the coefficients stored in the memory device;

calculating, by the computer and using a second arithmetic expression, a second probability of occurrence of the model formula based on second input values and second output values, wherein the second input values and the number of the second input values differ from those of the first input values, and the second output values and the number of the second output values differ from those of the first output values;

calculating, by the computer and using a third arithmetic expression in which the first arithmetic expression and the second arithmetic expression are joined, a joint probability in which the first probability and the second probability are joined;

extracting, by the computer, values of the coefficients of the model formula that maximize the joint probability; and outputting the extracted values of the coefficients by the computer, wherein the extracted values are associated with the model formula;

wherein each of the coefficients is obtained by a partial differentiation with respect to the each coefficient.

9. The model generating method according to claim 8, wherein the statistical values include the number of the coefficients, a mean and a standard deviation of the coefficients, the number of the second input values is smaller than that of the first input values, and the number of the second output values is smaller than that of the first output values.

* * * * *